(12) United States Patent
Bridges et al.

(10) Patent No.: US 6,560,677 B1
(45) Date of Patent: May 6, 2003

(54) METHODS, CACHE MEMORIES, SYSTEMS AND COMPUTER PROGRAM PRODUCTS FOR STORING TRANSIENT, NORMAL, AND LOCKED ENTRIES IN AN ASSOCIATIVE CACHE MEMORY

(75) Inventors: Jeffrey Todd Bridges, Raleigh, NC (US); Thomas Andrew Sartorius, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/304,664

(22) Filed: May 4, 1999

(51) Int. Cl.[7] ............................................. G06F 12/08
(52) U.S. Cl. ..................... 711/129; 711/128; 711/134
(58) Field of Search ................................ 711/128, 129, 711/134, 118, 133, 136

(56) References Cited

U.S. PATENT DOCUMENTS

| | | | |
|---|---|---|---|
| 4,513,367 A | 4/1985 | Chan et al. | 364/200 |
| 4,977,498 A | 12/1990 | Rastegar et al. | 364/200 |
| 5,025,366 A | 6/1991 | Baror | 364/200 |
| 5,367,653 A | 11/1994 | Coyle et al. | 395/400 |
| 5,493,667 A | 2/1996 | Huck et al. | 395/452 |
| 5,519,846 A * | 5/1996 | Swenson | 711/130 |
| 5,553,262 A * | 9/1996 | Ishida et al. | 711/123 |
| 5,555,393 A | 9/1996 | Tanaka et al. | 395/460 |
| 5,584,014 A | 12/1996 | Nayfeh et al. | 395/461 |
| 5,627,992 A | 5/1997 | Baror | 395/460 |
| 5,732,242 A * | 3/1998 | Mowry | 711/136 |
| 5,809,527 A | 9/1998 | Cooper et al. | 711/133 |
| 6,185,657 B1 * | 2/2001 | Moyer | 711/128 |
| 6,202,129 B1 * | 3/2001 | Palanca et al. | 711/133 |
| 6,047,358 A1 * | 4/2001 | Jacobs | 711/133 |
| 6,219,760 B1 * | 4/2001 | McMinn | 711/137 |
| 6,223,256 B1 * | 4/2001 | Gaither | 711/134 |

OTHER PUBLICATIONS

Intel, SA–1100 Microprocessor, Technical Reference Manual, Sep. 1998.

* cited by examiner

Primary Examiner—Gary J Portka
(74) Attorney, Agent, or Firm—Myers, Bigel, Sibley & Sajovec, P.A.; John D. Flynn

(57) ABSTRACT

Ways of a cache memory system are designated as being in one of three subsets: a normal subset, a transient subset, and a locked subset. The designation of the respective subsets is provided by a normal subset floor index, a transient subset floor index, and a transient subset ceiling index. The respective indexes are used to select the subset into which new entries are copied from main memory as a result of a cache miss. If the new entry is designated as being characterized by normal program behavior, it is copied into the normal subset in the cache. If the new entry is designated as being characterized by transient program behavior, it is copied into the transient subset in the cache. The relationship between the normal subset and the transient subset is programmable. For example, the normal and the transient subsets may include at least one common way of the cache memory or the transient subset may be completely included in the normal subset or completely separate therefrom.

49 Claims, 6 Drawing Sheets

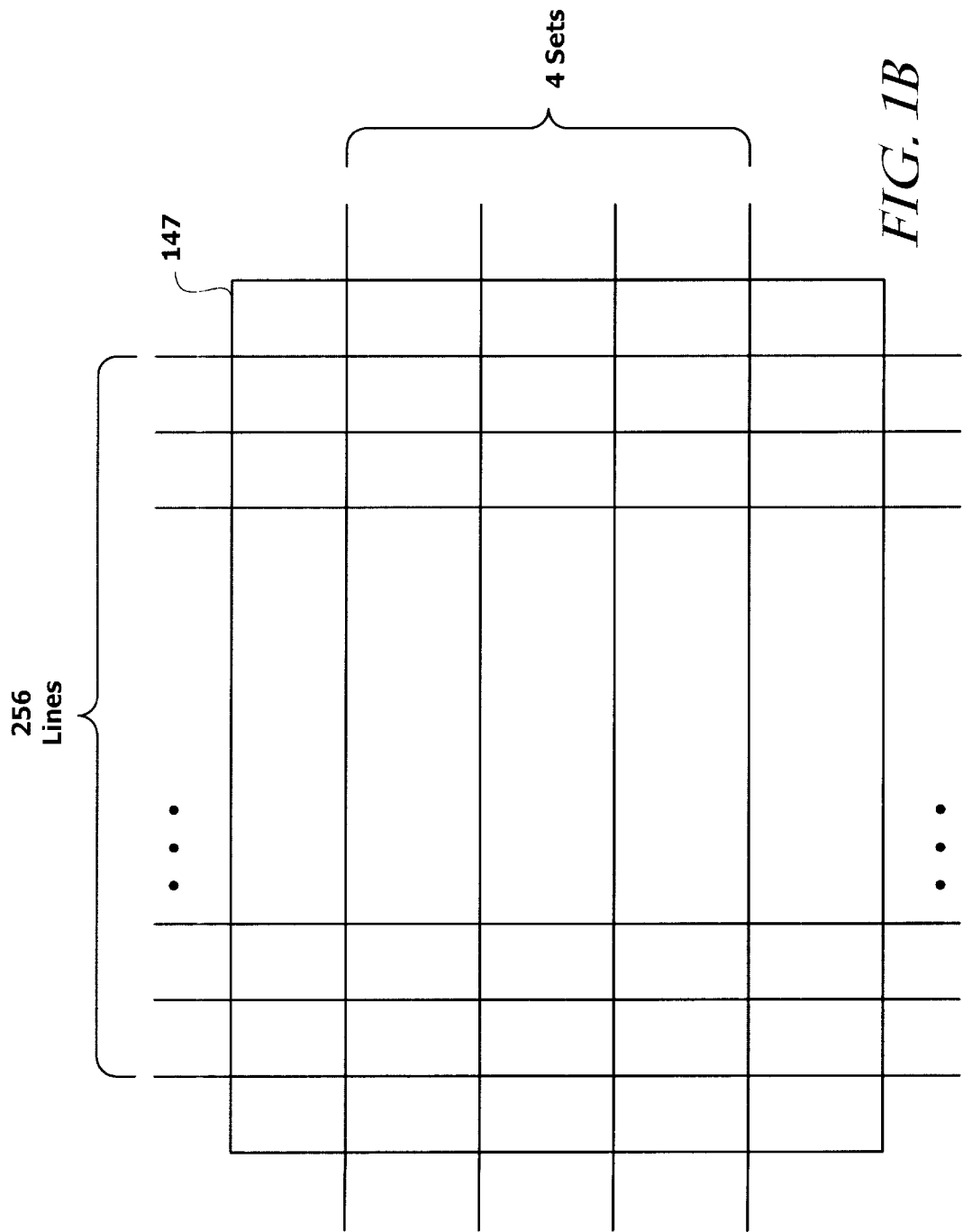

METHODS, CACHE MEMORIES, SYSTEMS AND COMPUTER PROGRAM PRODUCTS FOR STORING TRANSIENT, NORMAL, AND LOCKED ENTRIES IN AN ASSOCIATIVE CACHE MEMORY

FIELD OF THE INVENTION

This invention relates to computer systems, and more particularly to cache memory systems.

BACKGROUND OF THE INVENTION

Cache memory has long been used in computing systems to decrease the memory access time for a Central Processing Unit (CPU) by reducing the number of accesses to a main memory. With respect to the main memory, the cache memory is typically a high speed, low capacity memory in which active portions of program instructions and/or data are stored. The cache memory is typically faster than a main memory by a factor of 5 to 10 and typically approaches the speed of the CPU itself. By keeping some of the most frequently accessed instructions and/or data in the cache memory, the average memory access time may approach the access time of the cache memory and thereby improve the overall performance of the computing system.

In particular, improved performance of the computing system may be achieved by presuming that the computer program exhibits a behavior known as "locality of reference." The locality of reference phenomenon recognizes that most computer program instruction processing proceeds in loops and subroutines which tends to limit memory references made by the computer program to a localized area of memory. Similarly, memory references to data may tend to be localized, because table lookup routines or other iterative routines may repeatedly refer to memory addresses within a relatively small range of memory addresses. Accordingly, although the cache memory may have small capacity, a large fraction of the data or instructions requested may be located in the cache memory and thereby improve the performance of the computing system. Data and/or instructions which exhibit locality of reference behavior are sometimes referred to as normal entries.

In operation, the CPU requests data or instructions for processing. If the requested data or instructions are stored in the cache memory (a cache hit), the requested data or instructions are provided to the CPU according to the speed of the cache memory. If, however, the requested data or instruction is not stored in the cache memory (a cache miss), a block of words (including the requested data or instruction) is accessed in the main memory and provided to the CPU according to the speed of the main memory. In addition, the block of words accessed in the main memory is copied into the cache memory so that future requests to the same words will be serviced by the cache memory. Accordingly, existing entries within the cache may be replaced by the block of words retrieved from the main memory. For example, when a cache miss results in a block of words being retrieved from main memory, a correspondingly sized portion of the cache may be replaced (overwritten) by the block of words retrieved from the main memory. The cache entries selected for replacement are sometimes referred to as "victims."

It is known to use replacement schemes, such as a Least Recently Used (LRU) or a round-robin scheme, to select the victims in the cache when a block is copied from main memory into the cache. For example, it is known to use an LRU scheme when replacing normal entries in the cache with data and/or instructions from main memory that exhibit the same locality of reference behavior (i. e., normal). Such cache systems are discussed in U.S. Pat. No. 5,809,527 entitled "Outboard File Cache System" to Cooper et al. which is incorporated herein by reference.

On the other hand, some data and/or instructions such as global variables or address pointers, are used by the CPU on an ongoing basis. Such data and/or instructions may be requested by the CPU despite the operational behavior exhibited by the computer program. For example, a program that otherwise exhibits locality of reference behavior may use an address pointer to a particular interrupt routine irrespective of the instructions the computer program is executing when an interrupt is received. Accordingly, some data and/or instructions stored in the cache can be locked so that they cannot be replaced, thereby improving the likelihood that the requested data and/or instructions are stored in the cache.

Although some types of data and instructions stored in the cache exhibit locality of reference behavior (e.g., normal entries) other types of entries may not. For example, the CPU may move video data from the main memory to a video frame buffer only once and subsequently may not request the same data again once the move is complete. Such data and/or instructions in the cache are referred to as "transient." In such situations, the locality of reference presumption, may degrade the performance of the cache memory by replacing normal entries (which may be subsequently requested) with transient entries. Consequently, subsequent requests for the normal entries which were replaced with the transient entries may result in cache misses, thereby reducing the performance of the cache. Accordingly, it is known to use separate cache memories to store transient and normal data and/or instructions. In view of the above, there exists a need to improve cache memories wherein different types of data and/or instructions (such as locked, normal, and transient) are processed in cache memory systems.

SUMMARY OF THE INVENTION

In view of the above, it is an object of the present invention to allow improvement in the performance of cache memories.

It is another object of the present invention to allow more efficient use of cache memories.

These and other objects of the present invention may be provided by designating normal, transient, and locked subsets of the ways of a cache memory. On a cache miss, entries from the main memory are copied into the normal or the transient subset of the ways of the cache memory. The subset to which the entry is copied is selected based on the program behavior associated with the entry copied from main memory. For example, if an entry in main memory has an attribute associated with it that indicates that the entry exhibits normal program behavior, the normal subset is selected. If the entry in main memory has an attribute associated with it that indicates that the entry exhibits transient program behavior, the transient subset is selected. In one embodiment, the attribute associated with the entry is held in a memory management page table. In an alternate embodiment, a particular instruction (such as a load transient or load normal instruction) in the instruction set of the CPU is used.

Designating the normal subset for normal entries and the transient subset for transient entries may allow both types of entries to be processed while reducing the likelihood that interaction between the normal and transient entries may adversely affect the performance of the cache. For example, if transient entries are allowed to overwrite normal entries the cache performance with respect to the normal entries may be reduced.

In a further aspect of the present invention, the designations of the normal, transient, and locked subsets are programmable. The designated subsets may, therefore, be altered to meet to changing processing requirements. For example, the designations of the subsets may be changed to designate a greater portion of the cache for normal entries.

In another aspect of the present invention, at least one way included in the transient subset is included in the normal subset. Accordingly, entries designated as normal or transient may be copied into the common ways of the subsets.

BRIEF DESCRIPTION OF THE FIGURES

FIG. 1B is a block diagram of an exemplary associative cache memory;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The term "data" refers to data and/or instructions stored in the cache memory system 100 or data and/or instructions stored in the main memory 115. It will also be understood that the terms "entry" or "cache entry" used herein include data and/or instructions stored in a cache memory system at an index in the cache memory. The index is used as an address to access the entries in the cache memory. Further, it will be understood that requests are made for entries that may or may not be stored at an index in the cache memory. In the case where a requested entry is not stored at an index in the cache memory, a main memory is accessed wherein the requested entry is accessed therein.

As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention is also described using a flow chart illustration. It will be understood that each block of the flowchart illustrations, and combinations of blocks in the flowchart illustrations, can be implemented by computer program instructions. These program instructions may be provided to a processor(s) within a computer system, such that the instructions which execute on the processor(s) create means for implementing the functions specified in the flowchart block or blocks. The computer program instructions may be executed by the processor(s) to cause a series of operational steps to be performed by the processor(s) to produce a computer implemented process such that the instructions which execute on the processor(s) provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

Figure 1A:
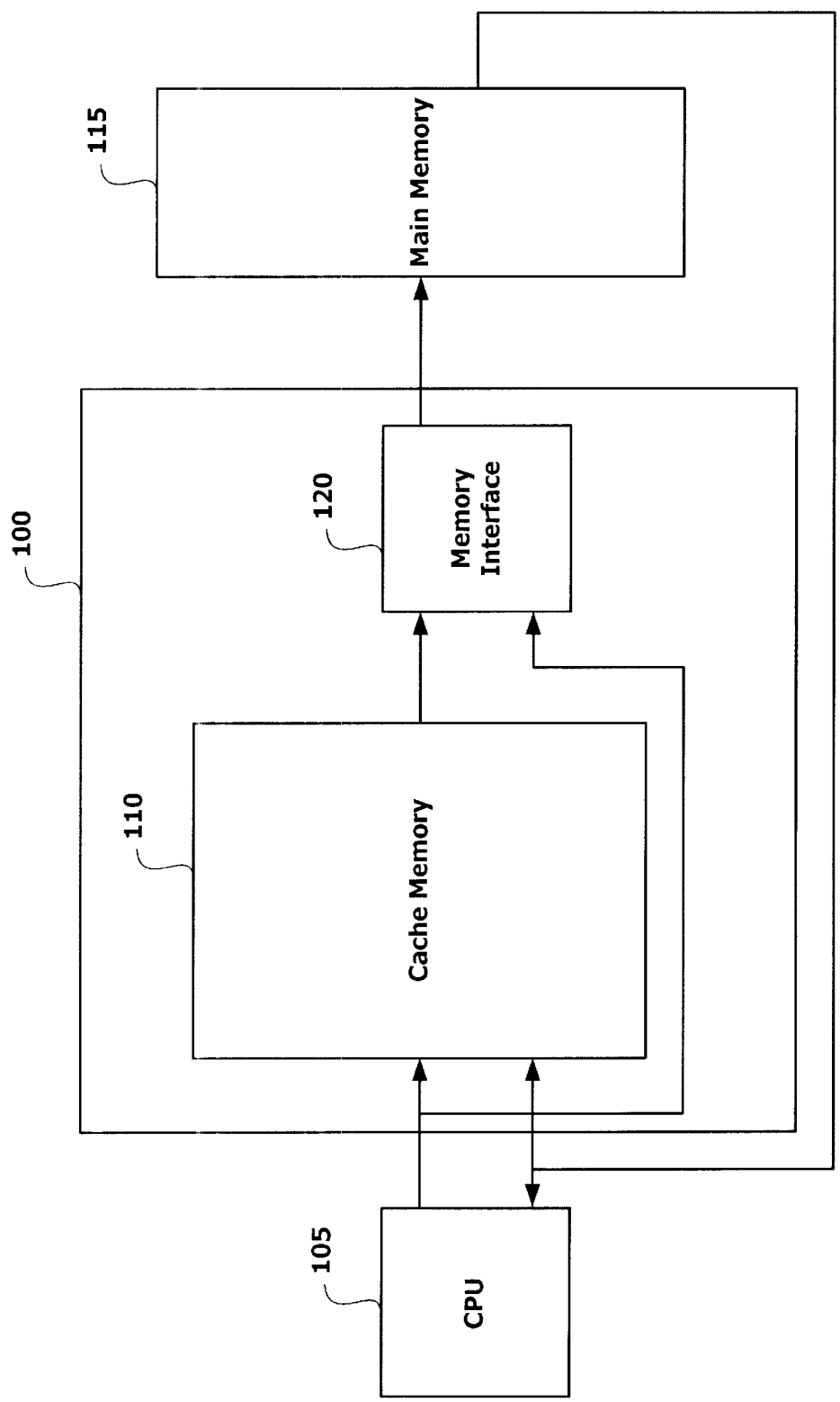
FIG. 1A is a block diagram of an embodiment of a computer system according to the present invention.

FIG. 1A is a block diagram of an embodiment of a computer system according to the present invention. A Central Processing Unit (CPU) 105 processes entries stored in a cache memory system 100 and a main memory 115 to carry out task assigned to the CPU by system software such as an operating system. It will be understood to those having skill in that art that the CPU 105 can be a single microprocessor or plurality of microprocessors in a multiprocessing computing system, wherein the microprocessor include a cache memory according to the present invention. Alternately, a cache memory according to the present invention may be located external to the microprocessor. For example, the present invention may be embodied in a secondary level cache on a computer motherboard. The main memory 115 may comprise Dynamic Random Access Memory (DRAM) or other types of storage devices suitable for use as a main memory with cache memories.

The cache memory system 100 includes a cache memory 110 that stores data as cache entries and a memory interface 120 that accesses data stored in the main memory 115. The entries in the cache memory 110 include a tag field and a data field. The CPU 105 requests an entry by providing an address to the cache memory 110. In one embodiment, the address provided by the CPU 105 is used to index into the cache memory 110 to access a tag field of the cache memory 110. If the cache memory 110 includes a tag field that matches the address provided by the CPU 105 (a cache hit), the data field associated with the matching tag field is provided to the CPU 105. If, however, the address provided by the CPU 105 does not match any of the tag fields stored in the cache memory 110 (a cache miss), the memory interface 120 uses the address provided by the CPU 105 to accesses the requested entry in the main memory 115 and provides the data to the CPU 105. In particular, the memory interface 120 accesses a cache line of data that includes the requested entry and the line is copied into the cache memory 110. In a preferred embodiment; a cache line comprises a unit of data which is replaced in the cache memory 110 on a cache miss and may include more or less or the same amount of data requested by the CPU 105.

In a preferred embodiment of the present invention, the cache memory 110 is a multi-way set associative cache memory. As will be understood by those having skill in the art, a "way" is one entry in each of the sets of the cache memory. A "set" is equal to one entry from each of the ways accessed. A portion of a way from a set of the cache memory comprises a cache line. For example, FIG. 1B is a simplified block diagram of an exemplary 32 KiloByte (KB) set associative cache organized as 4 sets with 32 byte lines. As shown in FIG. 1B, the organization of the ways and sets is represented as a matrix 147, wherein each row represents one of the four sets and the intersection of each row and column represents a cache line of 32 bytes. A way, therefore, comprises the four cache lines represented by the intersection of one column with each of the four rows (sets). Multi-way set associative caches are discussed in U.S. Pat. No. 5,367,653 to Coyle et al. entitled "Reconfigurable Multi-Way Associative Cache Memories" and assigned to the present assignee which is incorporated herein by reference.

Figure 2:
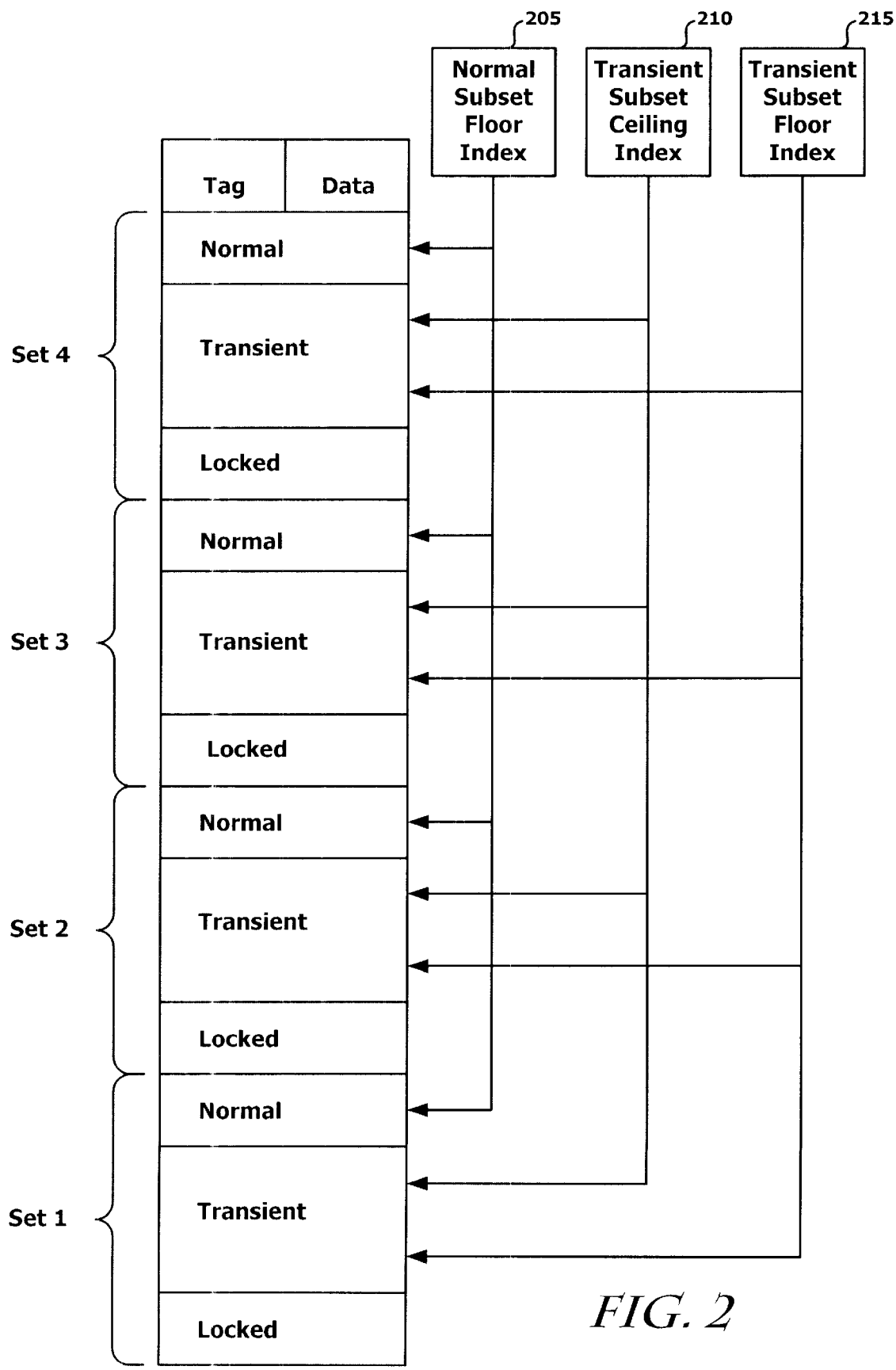
FIG. 2 is a block diagram of a first embodiment of a cache memory system having normal, transient, and locked subsets designated therein according to the present invention.

FIG. 2 is a block diagram of a first embodiment of an associative cache memory 200 and subset indexes 205, 210, 215 according to the present invention. According to FIG. 2, the associative cache memory 200 is a 256-way set associative cache memory organized as 4 sets wherein each set includes 256 lines. A way comprises one entry from each of the 4 sets. Each of the 256 ways can be designated as being included in one of three subsets of the 256 ways: normal, transient, or locked. The designation of each way is based on three subset indexes: a normal subset floor index 205, a transient subset ceiling index 210, and a transient subset floor index 215. As shown in FIG. 2, the normal subset of the 256 ways starts at the way which corresponds to the normal subset floor index 205 and ends at the last way in the cache memory. The transient subset of the 256 ways starts at the way which corresponds to the transient subset floor 215 index and ends at the way which corresponds to the transient subset ceiling index 210. All of the ways not included in either the normal or transient subsets are in the locked subset. In a preferred embodiment, each of the sets in the associative cache memory 200 is implemented using a Content Addressable Memory (CAM) wherein each set is embodied as a 256 entry fully set associative cache memory.

The subset index values can be the same for each of the 4 sets in the associative cache memory 200 or can be different for each of the sets. Accordingly, in a further embodiment, separate subset indexes are maintained for each of the sets so that separate normal, transient, and locked subsets can be designated for each set.

The subset indexes can be stored in a register so that the subset index values can be referenced and updated during operation of the associative cache memory 200. In particular, storing the subset indexes in a register enables system software to update the designation of the subsets dynamically. When the data processed by the CPU 105 changes, the system software can change the designations of the subsets to preserve the performance of the associative cache memory despite the change in the program behavior exhibited by the data. The designated subsets may, therefore, be altered to meet to changing processing requirements. For example, the designations of the subsets may be changed to designate a greater portion of the cache for normal entries.

On a cache miss a cache line including, the requested entry is copied from the main memory 115 to a selected subset of the ways of the associative cache memory 200. The subset is selected based on an indication of the program behavior associated with the address of the cache line copied from the main memory 115. For example, if the process is designated as exhibiting normal program behavior, the cache line is copied into the normal subset. If the access is designated as exhibiting transient program behavior, it is copied into the transient subset. The program behavior of the cache line can be determined via an indication associated with the address in main memory 115 from which the cache line was accessed or using a storage instruction which has an associated program behavior (such as a first instruction used to copy transient data from main memory 115 and a second instruction used to copy normal data from the main memory 115 to the associative cache memory 200).

The line is copied from the main memory 115 into the selected subset and overwrites an existing entry in the associative cache memory 200. Accordingly, an existing entry in the associative cache memory 200 is selected for replacement (the victim) in the selected subset of the associative cache memory 200. The scheme for victim selection can comprise a least recently used scheme, a round-robin scheme, or another victim replacement scheme known to those having skill in the art. In a preferred embodiment, the victim selection scheme is tailored to the subset for which victim indexes are generated. For example, the normal subset may use a least recently used scheme because of the locality of reference behavior exhibited by the normal data. The transient subset may use an incremental round-robin scheme due to the fact that transient data is accessed once and in a linear fashion, such as when processing video data. In another embodiment, the victim selection scheme is the same for the normal and transient subsets.

Figure 3:
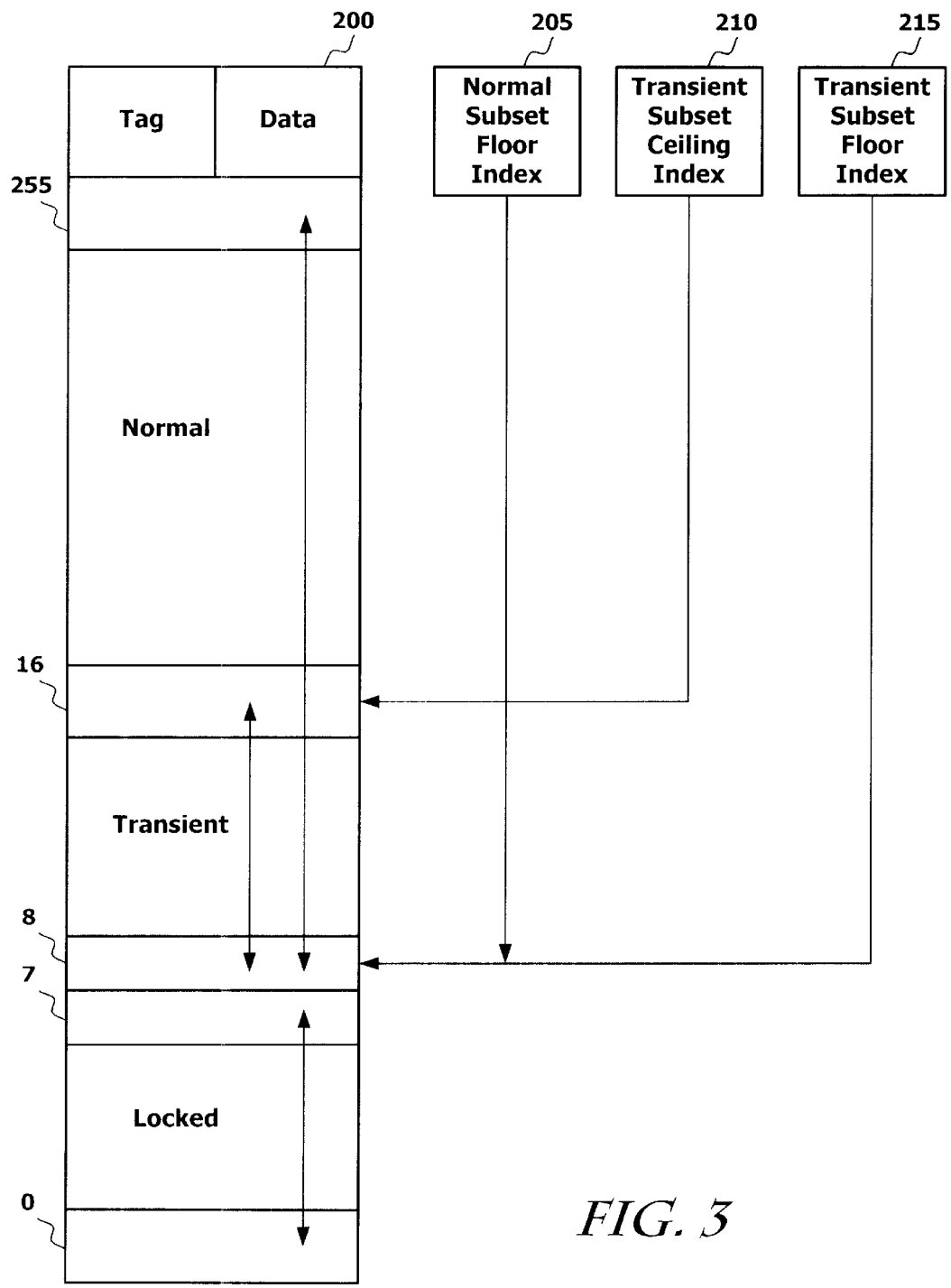
FIG. 3 is a block diagram of a second embodiment of a cache memory system having normal, transient, and locked subsets designated therein according to the present invention.

FIG. 3 is block diagram of a second embodiment of the associative cache memory 200 and subset index 205, 210, 215 shown in FIG. 2. According to FIG. 3, the subset indexes designate that the transient subset is included in (or overlaps) the normal subset. For example, entries that exhibit transient program behavior are stored at indexes 8 to 16 in the associative cache memory 200. Entries that exhibit normal program behavior are be stored at indexes 8 to 255. Consequently, transient entries can overwrite normal entries stored at indexes 8 to 16. Similarly, transient entries in the associative cache memory 200 can be overwritten with normal entries.

Including the transient subset in the normal subset may provide improved performance of the associative cache memory 200 by allowing more entries of the associative cache memory 200 to be used for normal data while still allowing the storage of transient data. For example, if a computing system according to the present invention processes mostly normal data, designating as many of the cache entries in the normal subset may improve performance. If, however, the computing system occasionally processes transient data as well, overlapping the normal and transient subsets may allow the transient data to be stored in the cache without significantly reducing the performance of the associative cache memory 200 with respect to processing of the normal data.

In a preferred embodiment, the subsets of the ways of the cache memory can be initialized by designating what will be in the locked subset during operation as normal until the desired entries are stored in the cache, and then changing the designation of the ways as being outside the normal or transient subset (i. e., in the locked subset). For example, if ways 0 through 7 are to designated as being in the locked subset during normal operation, the system can initially store the locked entries by designating ways 0 though 7 as being in the normal subset (such as by setting the normal subset floor index to 0). Accordingly, entries can then be copied to ways 0 through 7. Then, the normal subset floor index is changed to exclude ways 0 through 7 (such as by setting the normal subset floor index to 8).

In an alternate embodiment, privileged storage instructions, such as "load and lock", are used to copy entries to the ways of the cache that are otherwise in the locked subset. Alternately, a storage attribute can be associated with the entries which are to be copied into the locked subset.

Figure 4:
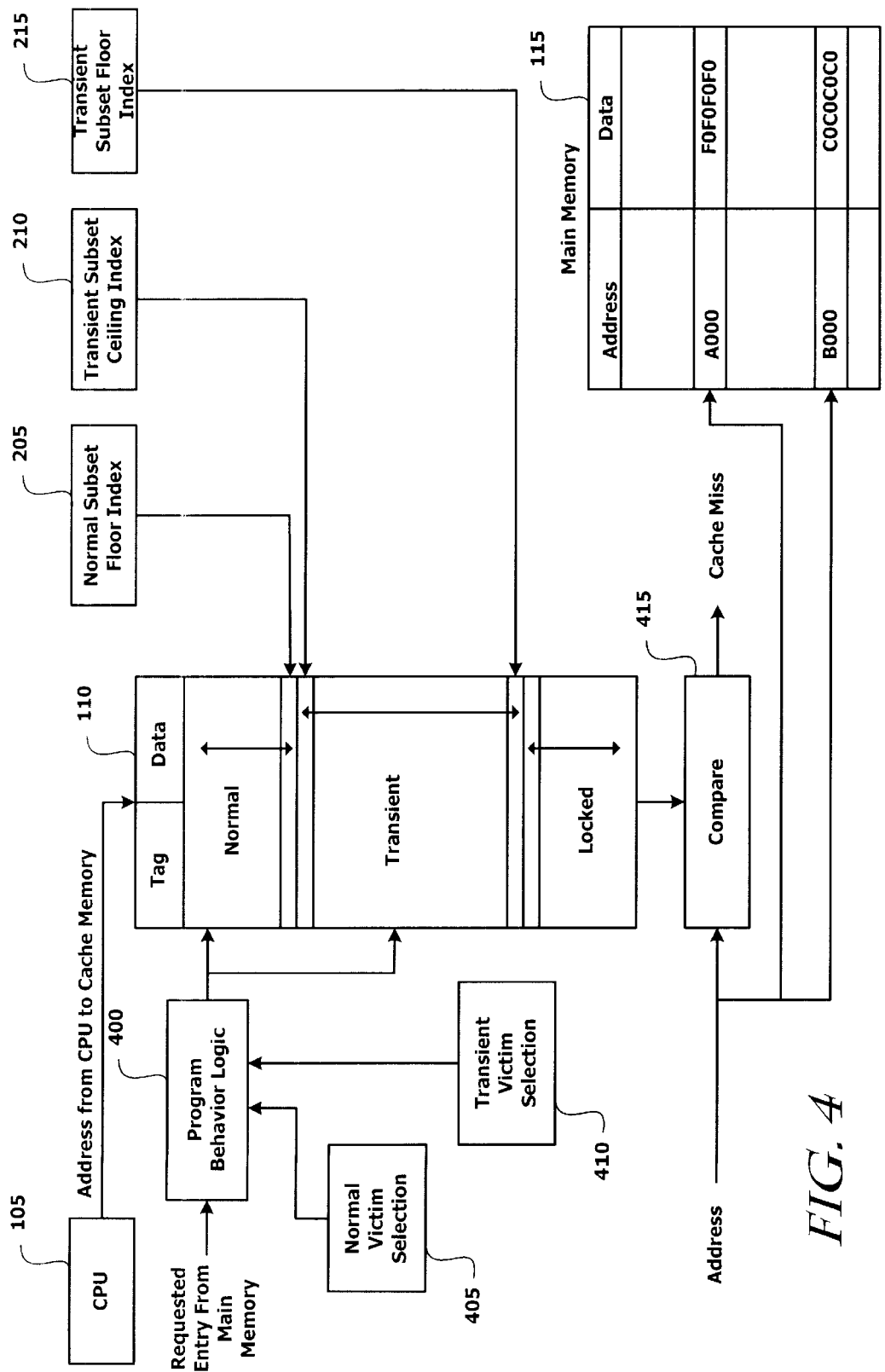
FIG. 4 is a block diagram of a third embodiment of a cache memory system according to the present invention.

A series of examples will now be described with reference to FIG. 4. According to FIG. 4, system software directs the CPU 105 to begin executing a word processing program, wherein a relatively large portion of the data processed by the CPU 105 exhibits normal program behavior. The normal, transient, and locked subsets are designated to provide adequately sized subsets for the operation of the cache memory. For example, initially the normal subset floor index may be set to designate a relatively large subset of the ways of the cache memory as normal. The transient subset floor index and the transient subset ceiling index are set to provide a relatively small subset of the of the ways of the cache memory as transient.

A first address $A000_{16}$ is provided by the CPU 105 to the cache memory. Each of the subsets of the ways of the cache memory is checked for a tag which is equal to $A000_{16}$ and a cache miss is indicated. The first address $A000_{16}$ is used to access the main memory 115 whereupon a cache line equal to $F0F0F0F0_{16}$ is provided to the program behavior logic 400. The program behavior logic 400 determines that the cache line accessed from the first address $A000_{16}$ of the main memory 115 has an associated normal program behavior attribute. The cache line $F0F0F0F0_{16}$ is copied into the normal subset of the cache memory at an index generated by normal victim selection logic 405.

Next, the system software directs the CPU 105 to begin executing an video processing program wherein a relatively large amount of the data processed exhibits transient program behavior. Consequently, the normal, transient, and locked subsets are re-designated to provide adequately sized subsets for the operation of the cache memory. For example, the normal subset floor index may be changed to designate a relatively small subset of the ways of the cache memory as normal. The transient subset floor index and the transient subset ceiling index are changed to provide a relatively large subset of the of the ways of the cache memory as transient. The increase in the size of the transient subset is intended to provide better cache memory performance in view of the different program behavior that may be exhibited by the video processing program.

A second address $B000_{16}$ is provided by the CPU 105 to the cache memory. Each of the subsets of the ways of the cache memory is checked for a tag which is a equal to $B000_{16}$ and a cache miss is indicated. The second address $B000_{16}$ is used to access the main memory 115 whereupon a cache line $C0C0C0C0_6$ is provided to the program behavior logic 400. The program behavior logic 400 determines that the cache line acceded from the second address $B000_{16}$ of the main memory 115 has an associated transient program behavior attribute. Accordingly, the cache line $C0C0C0C0_{16}$ is copied into the transient subset of the cache memory at an index generated by transient victim selection logic 410.

Figure 5:
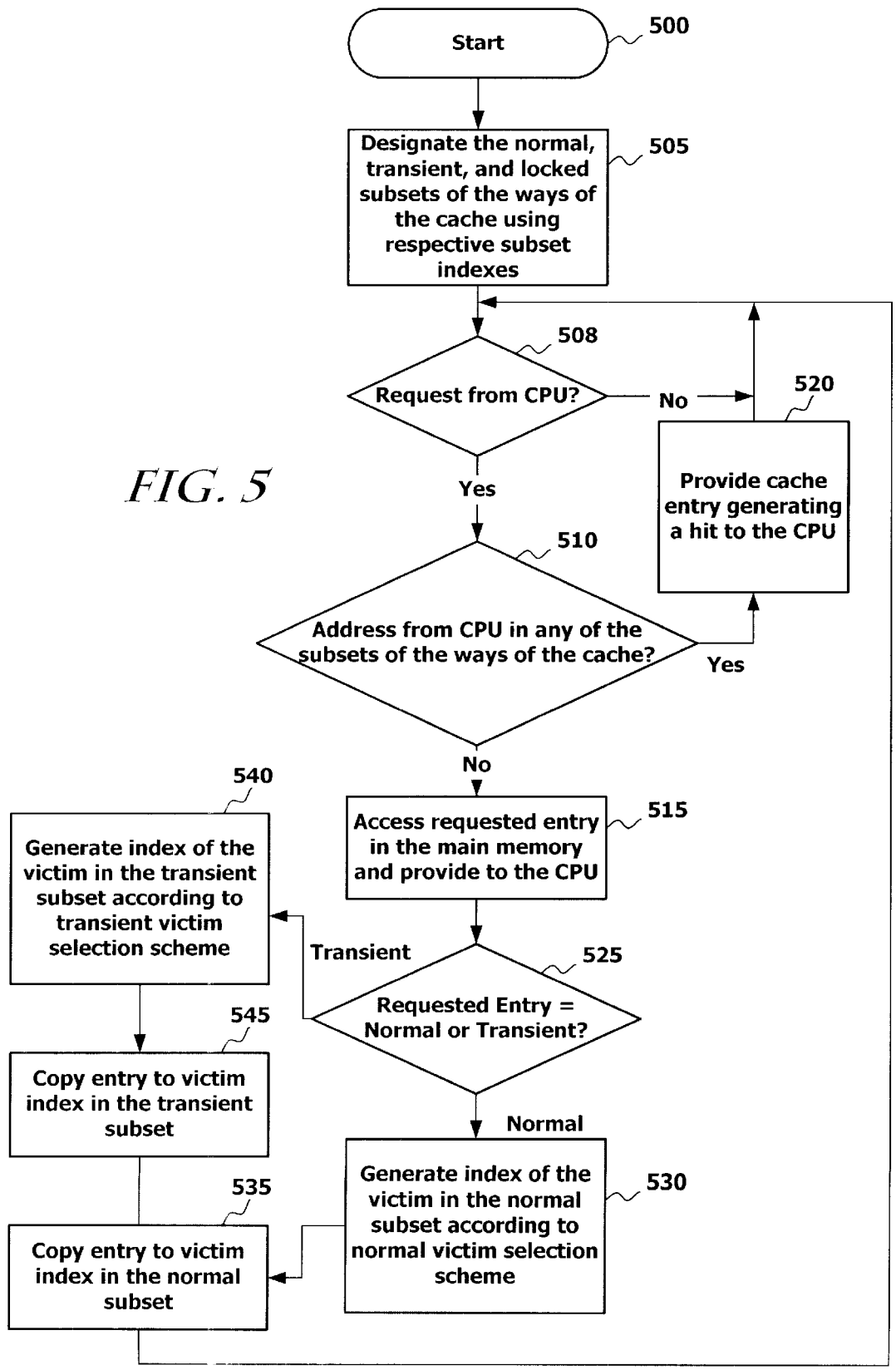
FIG. 5 is a flowchart that illustrates operations of a cache memory system according to the present invention.

FIG. 5 is a flowchart that illustrates operations of a cache memory 110 according to the present invention. According to FIG. 5, processing begins at block 500. The normal, transient, and locked subsets of the ways of the cache memory are designated using the normal subset floor index, the transient subset ceiling index, and the transient subset floor index (block 505).

When a request for an entry is received from the CPU, the cache determines if the requested entry is stored in any of the normal, transient, or locked subsets (block 510). If the requested entry is stored in the cache (a cache hit), the requested entry is provided to the CPU (block 520) whereupon processing continues when a new request is received from the CPU (block 508).

If the requested entry is not stored in the CPU (block 510), a cache miss occurs and the requested entry is accessed in the main memory and provided to the CPU (block 515). If the requested entry exhibits normal program behavior (block 525), the normal victim selection logic generates a victim index (block 530) whereupon the entry accessed from main memory is stored at the generated victim index in the normal subset of the ways of the cache memory (block 535). Processing continues when a new request is received from the CPU (block 508).

If the requested entry exhibits transient program behavior (block 525), the transient victim selection logic generates a victim index (block 540) whereupon the entry accessed from main memory is stored at the generated victim index in the transient subset of the ways of the cache memory (block 545). Processing continues when a new request is received from the CPU (block 508).

Although the present invention is described herein by reference to operations of cache memory systems in computer systems, it will be understood that the present invention may be utilized in operations of other computer applications, such as networked file systems. For example, according to the present invention, files may be cached in a networked environment wherein some of the files are designated to be in a normal subset of the file cache while other files are designated to be in a transient subset of the file cache.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of storing entries in a plurality of ways in an associative cache memory, the method comprising the steps of:

designating a first subset of the plurality of ways of the associative cache memory in which to store normal entries having locality of reference program behavior associated therewith;

designating a second subset of the plurality of ways of the associative cache memory in which to store transient entries having transient program behavior associated therewith;

designating a third subset of the plurality of ways of the associative cache memory in which to store locked entries which remain in the associative cache memory, based on the designation of the first and second subsets of the associative cache memory, wherein the designated ways included in the first, second, and third subsets of the plurality of ways of the associative cache memory are programmable, and wherein the designations of the first and second subsets of the plurality of ways are programmed using a normal subset floor index that identifies the start of the normal subset of the plurality of ways; and a transient subset floor index and a transient subset ceiling index which designate the start and the end of the transient subset respectively.

2. The method of claim 1, wherein the first subset includes at least one way included in the second subset.

3. The method of claim 1, wherein the first subset includes none of the ways included in the second subset.

4. The method of claim 1, further comprising the step of:
 determining that a requested entry is not stored in the first, second, and third subsets of the plurality of ways of the associative cache memory.

5. The method of claim 4, further comprising the steps of:
 obtaining the requested entry from a memory external to the associative cache memory;
 selecting the first or second subset of the plurality of ways of the associative cache memory for storage of the obtained requested entry based on a program behavior indicator associated with the requested entry;
 writing the obtained requested entry to the first subset of the plurality of ways of the associative cache memory if the obtained requested entry has normal program behavior associated therewith; and
 writing the obtained requested entry to the second subset of the plurality of ways of the associative cache memory if the obtained requested entry has transient program behavior associated therewith.

6. The method of claim 5, wherein the step of selecting comprises selecting the first or second subset of the plurality of ways of the associative cache memory for storage of the obtained requested entry based on a program behavior indicator associated with an address of the requested entry.

7. The method of claim 5, wherein the step of selecting comprises selecting the first or second subset of the plurality of ways of the associative cache memory for storage of the obtained requested entry based on a program behavior indicator associated with a load instruction used to store the obtained requested entry in the cache memory.

8. The method of claim 5, wherein the step of selecting comprises the step of selecting the first or second subset of the plurality of ways of the associative cache memory for storage of the obtained requested entry based on an storage instruction used to write the requested entry to the associative cache memory, wherein the storage instruction has the program behavior associated therewith or based on a program behavior attribute associated with an address of a main memory from which the requested entry was accessed.

9. The method of claim 5, wherein the step of writing the requested entry accessed external to the associative cache memory in the first subset of the plurality of ways of the associative cache memory comprises the step of selecting a way included in the first subset of the plurality of ways of the associative cache memory using at least one of a least recently used and a round robin scheme.

10. The method of claim 5, wherein the step of writing the requested entry accessed external to the associative cache memory in the second subset of the plurality of ways of the associative cache memory comprises the step of selecting a way included in the second subset of the plurality of ways of the associative cache memory using at least one of a least recently used and a round robin scheme.

11. The method claim 1, wherein the step of designating a first subset of the plurality of ways of the associative cache memory comprises the step of designating a first subset of the plurality of ways of the associative cache memory for each of a plurality of sets in the associative cache memory, wherein the plurality of sets each include a respective plurality of ways of the associative cache memory.

12. The method claim 1, wherein the step of designating a second subset of the plurality of ways of the associative cache memory comprises the step of designating a second subset of the plurality of ways of the associative cache memory for each of a plurality of sets in the associative cache memory, wherein the plurality of sets each include a plurality of ways of the associative cache memory.

13. A data processing system comprising:
 a central processing unit that requests entries stored at addresses;
 an associative cache memory, responsive to the central processing unit, that determines if the requested entries are stored in the associative cache memory, wherein the associative cache memory includes a plurality of ways including a first subset of the plurality of ways of the associative cache memory that stores normal entries having locality of reference program behavior associated therewith, a second subset of the plurality of ways of the associative cache memory that stores transient entries having transient program behavior associated therewith, and a third subset of the plurality of ways of the associative cache memory that stores locked entries which remain in the associative cache memory; and
 a memory interface, responsive to the associative cache memory, that accesses the requested entries that are not stored in the associative cache memory external to the microprocessor, wherein the designations of the first and second subsets of the plurality of ways are programmed using a normal subset floor index that identifies the start of the normal subset of the plurality of ways; and a transient subset floor index and a transient subset ceiling index which designate the start and the end of the transient subset respectively.

14. The data processing system of claim 13, wherein the first subset includes at least one way included in the second subset.

15. The data processing system of claim 13, wherein the first subset includes none of the ways included in the second subset.

16. The data processing system of claim 13, wherein the designated ways included in the first, second, and third subsets of the plurality of ways of the associative cache memory are programmable.

17. The data processing system of claim 13, wherein the associative cache memory further comprises:
 compare logic that determines that the requested entry is not stored in the first, second, and third subsets of the plurality of ways of the associative cache memory.

18. The data processing system of claim 17 further comprising:
 program behavior logic that selects the first or second subset of the plurality of the ways of the associative cache memory based on a program behavior associated with the requested entry accessed external to the associative cache memory; and
 control logic that stores the requested entry accessed external to the associative cache memory at a victim index in the selected subset of the plurality of the ways of the associative cache memory.

19. The data processing system of claim 18, wherein the program behavior associated with the requested entry accessed external to the associative cache memory comprises a program behavior attribute associated with an address of the requested entry or a storage instruction having the program behavior attribute associated therewith, wherein the storage instruction is used to store the requested entry in the associative cache memory.

20. The data processing system of claim 18, wherein the victim index is generated using at least one of a least recently used scheme and a round-robin scheme.

21. An associative cache memory including a plurality of ways that store entries therein, the associative cache memory comprising:
  a first subset of the plurality of ways of the associative cache memory that stores normal entries having locality of reference program behavior associated therewith;
  a second subset of the plurality of ways of the associative cache memory that stores transient entries having transient program behavior associated therewith; and
  a third subset of the plurality of ways of the associative cache memory that stores locked entries which remain in the associative cache memory, wherein the designations of the first and second subsets of the plurality of ways are programmed using a normal subset floor index that identifies the start of the normal subset of the plurality of ways; and a transient subset floor index and a transient subset ceiling index which designate the start and the end of the transient subset respectively.

22. The associative cache memory of claim 21, wherein the first subset of the plurality of ways includes at least one way included in the second subset.

23. The associative cache memory of claim 21, wherein the ways included in the first, second, and third subsets of the plurality of ways of the associative cache memory are programmable.

24. The associative cache memory of claim 21, wherein the associative cache memory further comprises:
  compare logic that determines whether the requested entry is stored in the first, second, and third subsets of the plurality of ways of the associative cache memory.

25. The associative cache memory of claim 24, further comprising:
  program behavior logic that selects the first or second subset of the plurality of the ways of the associative cache memory for storage of the requested entry based on a program behavior associated with the requested entry accessed external to the associative cache memory; and
  control logic that stores the requested entry accessed external to the associative cache memory at a victim index in the selected subset of the plurality of the ways of the associative cache memory.

26. The associative cache memory of claim 25, wherein the program behavior associated with the requested entry accessed external to the associative cache memory comprises a program behavior attribute associated with an address of the requested entry in a main memory or a storage instruction having the program behavior attribute associated therewith, wherein the storage instruction is used to store the requested entry in the associative cache memory.

27. The associative cache memory of claim 25, wherein the victim index is generated using at least one of a least recently used scheme and a round-robin scheme.

28. An associative cache memory that stores entries in a plurality of ways of the cache memory, the associative cache memory comprising:
  means for designating a first subset of the plurality of ways of the cache memory in which to store normal entries having locality of reference program behavior associated therewith;
  means for designating a second subset of the plurality of ways of the cache memory in which to store transient entries having transient program behavior associated therewith; and
  means for designating a third subset of the plurality of ways of the cache memory in which to store locked entries which remain in the cache memory, based on the designation of the first and second subsets of the cache memory,
  wherein the designations of the first and second subsets of the plurality of ways are program ed using a normal subset floor index that identifies the start of the normal subset of the plurality of ways; and a transient subset floor index and a transient subset ceiling index which designate the start and the end of the transient subset respectively.

29. The associative cache memory of claim 28, wherein the first subset includes at least one way included in the second subset.

30. The associative cache memory of claim 28, wherein the first subset includes none of the ways included in the second subset.

31. The associative cache memory of claim 28, further comprising:
  means for determining that a requested entry is not stored in the first, second, and third subsets of the plurality of ways of the cache memory.

32. The associative cache memory of claim 31, further comprising:
  means for obtaining the requested entry from a memory external to the associative cache memory;
  means for selecting the first or second subset of the plurality of ways of the cache memory for storage of the obtained requested entry based on a program behavior indicator associated with the requested entry;
  means for writing the obtained requested entry to the first subset of the plurality of ways of the cache memory if the obtained requested entry has normal program behavior associated therewith; and
  means for writing the obtained requested entry to the second subset of the plurality of ways of the cache memory if the obtained requested entry has transient program behavior associated therewith.

33. The associative cache memory of claim 32, wherein the program behavior indicator comprises an address of the requested entry or a load instruction used to write the obtained requested entry to the cache memory.

34. The associative cache memory of claim 32, wherein the means for selecting comprises means for selecting the first or second subset of the plurality of ways of the cache memory for storage of the requested entry based on an storage instruction used to write the requested entry to the cache memory, wherein the storage instruction has the program behavior associated therewith or based on a program behavior attribute associated with an address of a main memory from which the requested entry was accessed.

35. The associative cache memory of claim 32, wherein the means for writing the requested entry accessed external to the associative cache memory in the first subset of the plurality of ways of the cache memory comprises means for selecting a way included in the first subset of the plurality of ways of the cache memory using at least one of a least recently used and a round robin scheme.

36. The associative cache memory of claim 32, wherein the means for writing the requested entry accessed external to the associative cache memory in the second subset of the plurality of ways of the cache memory comprises means for selecting a way included in the second subset of the plurality of ways of the cache memory using at least one of a least recently used and a round robin scheme.

37. The associative cache memory of claim 28, wherein the means for designating a first subset of the plurality of ways of the cache memory comprises means for designating a first subset of the plurality of ways of the cache memory for each of a plurality of sets in the cache memory, wherein the plurality of sets each include a respective plurality of ways of the associative cache memory.

38. The associative cache memory of claim 28, wherein the means for designating a second subset of the plurality of ways of the cache memory comprises means for designating a second subset of the plurality of ways of the cache memory for each of a plurality of sets in the cache memory, wherein the plurality of sets each include a respective plurality of ways of the associative cache memory.

39. A computer program product for storing entries in a plurality of ways in an associative cache memory comprising:
   a computer readable storage medium having computer readable code means embodied therein, the computer readable code means comprising:
      computer program means for designating a first subset of the plurality of ways of the associative cache memory in which to store normal entries having locality of reference program behavior associated therewith;
      computer program means for designating a second subset of the plurality of ways of the associative cache memory in which to store transient entries having transient program behavior associated therewith; and
   computer program means for designating a third subset of the plurality of ways of the associative cache memory in which to store locked entries which remain in the associative cache memory, based on the designation of the first and second subsets of the associative cache memory,
   wherein the designations of the first and second subsets of the plurality of ways arm programmed using a normal subset floor index that identifies the start of the normal subset of the plurality of ways; and a transient subset floor index and a transient subset ceiling index which designates the start and the end of the transient subset respectively.

40. The computer program product of claim 39, wherein the first subset includes at least one way included in the second subset.

41. The computer program product of claim 39, wherein the first subset includes none of the ways included in the second subset.

42. The computer program product of claim 39, further comprising:
   computer program means for determining that a requested entry is not stored in the first, second, and third subsets of the plurality of ways of the associative cache memory.

43. The computer program product of claim 42, further comprising:
   computer program means for obtaining the requested entry from a memory external to the associative cache memory;
   computer program means for selecting the first or second subset of the plurality of ways of the associative cache memory for storage of the obtained requested entry based on a program behavior indicator associated with the requested entry;
   computer program means for writing the obtained requested entry in the first subset of the plurality of ways of the associative cache memory if the obtained requested entry has normal program behavior associated therewith; and
   computer program means for writing the obtained requested entry in the second subset of the plurality of ways of the associative cache memory if the obtained requested entry has transient program behavior associated therewith.

44. The computer program product of claim 43, wherein the program behavior indicator comprises an address of the requested entry or a load instruction used to write the obtained requested entry to the cache memory.

45. The computer program product of claim 43, wherein the computer program means for selecting comprises computer program means for selecting the first or second subset of the plurality of ways of the associative cache memory for storage of the requested entry based on an storage instruction used to write the requested entry to the associative cache memory, wherein the storage instruction has the program behavior associated therewith or based on a program behavior attribute associated with an address of a main memory from which the requested entry was accessed.

46. The computer program product of claim 43, wherein the computer program means for writing the requested entry accessed external to the associative cache memory in the first subset of the plurality of ways of the associative cache memory comprises computer program means for selecting a way included in the first subset of the plurality of ways of the associative cache memory using a least recently used or round robin scheme.

47. The computer program product of claim 43, wherein the computer program means for writing the requested entry accessed external to the associative cache memory in the second subset of the plurality of ways of the associative cache memory comprises computer program means for selecting a way included in the second subset of the plurality of ways of the associative cache memory using a least recently used or round robin scheme.

48. The computer program product of claim 39, wherein the computer program means for designating a first subset of the plurality of ways of the associative cache memory comprises computer program means for designating a first subset of the plurality of ways of the associative cache memory for each of a plurality of sets in the associative cache memory, wherein the plurality of sets each include a respective plurality of ways of the associative cache memory.

49. The computer program product of claim 39, wherein the computer program means for designating a second subset of the plurality of ways of the associative cache memory comprises computer program means for designating a second subset of the plurality of ways of the associative cache memory for each of a plurality of sets in the associative cache memory, wherein the plurality of sets each include a plurality of ways of the associative cache memory.

* * * * *